(12) United States Patent
Tan et al.

(10) Patent No.: US 11,417,238 B2
(45) Date of Patent: Aug. 16, 2022

(54) METHOD, SYSTEM AND APPARATUS OF DETERMINING SEARCH PARAMETERS FOR WELDING SEAM POINT CALIBRATION

(71) Applicant: ABB Schweiz AG, Baden (CH)

(72) Inventors: Jiajing Tan, Shanghai (CN); Shaojie Cheng, Shanghai (CN); Lei Mao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 451 days.

(21) Appl. No.: 16/049,046

(22) Filed: Jul. 30, 2018

(65) Prior Publication Data

US 2018/0336800 A1    Nov. 22, 2018

Related U.S. Application Data

(63) Continuation of application No. PCT/CN2016/077482, filed on Mar. 28, 2016.

(51) Int. Cl.
G09B 19/24    (2006.01)
G09B 25/02    (2006.01)

(52) U.S. Cl.
CPC ............. *G09B 19/24* (2013.01); *G09B 25/02* (2013.01)

(58) Field of Classification Search
CPC ................................ G09B 19/24; G09B 25/02
See application file for complete search history.

(56) References Cited

U.S. PATENT DOCUMENTS 5,904,864 A * 5/1999 Nester .................. B23K 9/0288
                                                           219/60.2
2004/0251866 A1* 12/2004 Gan .................... G05B 19/4083
                                                           318/568.11
(Continued)

FOREIGN PATENT DOCUMENTS

CN    101719333 A    6/2010
CN    101804498 A    8/2010
(Continued)

OTHER PUBLICATIONS

Chang, Doyoung, e. al., Development of a Characteristic Point Detecting Seam Tracking Algorithm for Portable Welding Robots (Year: 2010).*

(Continued)

*Primary Examiner* — Steve Rowland
(74) *Attorney, Agent, or Firm* — Greenberg Traurig, LLP

(57) ABSTRACT

A method, system and apparatus of determining search parameters for welding seam point calibration. The method includes determining, for a seam vertex point on a welding seam, three reference faces which are perpendicular to each other, based on geometry of an object to be weld in a virtual model; and determining a start point and a search point of a search motion for welding seam point calibration based on the three reference faces and predetermined criteria respectively for the start point and the search point. Three reference faces can be extracted automatically, and search parameters needed for the search instructions can be determined based thereon which enables automatic generation of search instructions and thus the time, manpower and cost for the welding seam point calibration can be reduced greatly.

16 Claims, 6 Drawing Sheets

(56) References Cited

U.S. PATENT DOCUMENTS

| | | | |
|---|---|---|---|
| 2011/0022216 A1* | 1/2011 | Andersson | G05B 19/401 700/114 |
| 2012/0106833 A1 | 5/2012 | Orth et al. | |
| 2013/0182070 A1 | 7/2013 | Peters et al. | |
| 2013/0189657 A1 | 7/2013 | Wallace et al. | |
| 2014/0081602 A1 | 3/2014 | Asamizu et al. | |
| 2014/0188274 A1* | 7/2014 | Namiki | B25J 9/1692 700/254 |
| 2015/0224648 A1 | 8/2015 | Lee et al. | |

FOREIGN PATENT DOCUMENTS

| | | |
|---|---|---|
| CN | 102216860 A | 10/2011 |
| CN | 102378943 A | 3/2012 |
| CN | 102430841 A | 5/2012 |
| CN | 102441719 A | 5/2012 |
| CN | 102622399 A | 8/2012 |
| CN | 105190725 A | 12/2015 |
| CN | 105210132 A | 12/2015 |
| DE | 102007008598 A1 | 8/2008 |
| EP | 1533671 A1 | 5/2005 |
| WO | 2010060459 A1 | 6/2010 |
| WO | 2010091086 A1 | 8/2010 |

OTHER PUBLICATIONS

Production specification Controller software IRC5 Robotware 5.07 (Year: 2004).*

Kim, Jae Seon et. al., A Robust Visual Seam Tracking System FoRobotic Arc Welding, 1996 (Year: 1996).*

The Product Manual for SmarTac, published Mar. 6, 2001 (Year: 2001).*

Tarn, Tzyh-Jong, Robotic Welding, Intelligence and Automation, 2007 (Year: 2007).*

Chang, Doyoung, et.al., Development of a Characteristic Point Detecting Seam Tracking Algorithm for Portable Welding Robots (Year: 2010).*

Bozek, Pavol, Robot Path Optimization for Spot Welding Applications in Automotive Industry, Technical Gazette 20, 2013 (Year: 2013).*

State Intellectual Property Office of the P.R. China, International Search Report & Written Opinion issued in corresponding Application No. PCT/CN2016/077482, dated Dec. 26, 2016, 10 pp.

European Patent Office, Extended European Search Report for corresponding application No. 16895787.6, dated Sep. 24, 2019, 8 pp.

M. Dinham et al., "Experiments on Automatic Seam Detection for a MIG Welding Robot," Lecture Notes in Computer Science, Artificial Intelligence and Computational Intelligence, dated 2011, vol. 7003, pp. 390-397, Springer, Berlin.

The State Intellectual Property Office of People's Republic of China, Second Office Action Issued in corresponding Chinese application No. 201680081738.2, dated Jul. 22, 2020, 27 pp.

The State Intellectual Property Office of People's Republic of China, First Office Action issued in corresponding Chinese application No. 201680081738.2, dated Jan. 6, 2020, 21 pp.

The State Intellectual Property Office of People's Republic of China, Search Report issued in corresponding Chinese application No. 201680081738.2, dated Dec. 26, 2019 4 pp.

"Principle & Application of Material Forming Process Control", Wuhan University Press, 2016.2, ISBN 978-7-307-17428-3, 2015, 24 pp.

European Patent Office, Office Action issued in corresponding Application No. 16895787.6, dated Dec. 9, 2020, 5 pp.

* cited by examiner

METHOD, SYSTEM AND APPARATUS OF DETERMINING SEARCH PARAMETERS FOR WELDING SEAM POINT CALIBRATION

FIELD OF THE INVENTION

Embodiments of the present disclosure generally relate to the field of robot welding, and more particularly relate to a method, system and apparatus of determining search parameters for welding seams point calibration.

BACKGROUND OF THE INVENTION

Nowadays, robots are wildly used in many fields such as welding, assembling, conveying, paint spraying, laser machining, etc. A welding robot can perform welding operations automatically in a predetermined way in accordance with a robot program. However, pre-programmed welding seam points cannot be directly used in a welding process since arrangements of objects to be weld and a robot in the field are always somewhat different from those in the virtual model and thus there might be different offsets for various objects to be weld. Thus, it is required to perform a calibration and correction of pre-programmed welding seam points prior to the welding process.

In existing solutions, a user can program and perform a searching program online for calibrating and correcting pre-programmed welding seam points in welding applications. SmarTac is an example of the search program in Arc welding application for controlling the robot to perform search motions to calibrate and correct the welding seam point. The search program such as SmartTac searching usually includes search instructions for instructing a robot to perform search motions, via-points between search motions and arithmetic instructions for adding an offset that SmarTac returned to a pre-programmed welding seam point to correct and calibrate the welding seam point. A search instruction includes several parameters which are required for enabling a robot to perform a search motion. In order to fill in parameters for a single search instruction, the user needs to manually find three face references for a welding seam point, which may indicate locations of the welding seam point in X, Y, Z dimensions respectively, and the user also needs to point out a start point for each search motion. After having settled the search instructions, the user further needs to input via-points into the search program so that the robot can have much smoother and collision-free moves.

It is rather time-consuming and tedious for the user to find face references for each single seam point manually, and the user has to perform a SmartTac searching for every application since the searches are solely dependent on the geometry of each object to be weld. In addition, the impossibility of reusing the search process makes the calibration and correction process less flexible and less efficient.

SUMMARY OF THE INVENTION

To this end, the present disclosure provides a solution for determining search parameters for welding seam point calibration, so as to solve or at least partially mitigate at least a part of problems in the prior art.

According to a first aspect of the present disclosure, there is provided a method of determining search parameters for welding seam point calibration, The method comprises determining, for a seam vertex point on a welding seam, three reference faces which are perpendicular to each other, based on geometry of an object to be weld in a virtual model. The method further comprises determining a start point and a search point of a search motion for welding seam point calibration based on the three reference faces and predetermined criteria respectively for the start point and the search point.

In a second aspect of the present disclosure, there is further provided a system of determining search parameters for welding seam point calibration. The system comprises one or more processors; a memory coupled to at least one of the processors; and a set of program instructions stored in the memory. The program instructions are executable by at least one of the processors to cause the system to: determine, for a seam vertex point on a welding seam, three reference faces which are perpendicular to each other, based on geometry of an object to be weld in a virtual model; and determine a start point and a search point of a search motion for welding seam point calibration based on the three reference faces and predetermined criteria respectively for the start point and the search point.

With embodiments of the present disclosure, three face references can be extracted automatically and search parameters needed for the search instructions can be determined based thereon, which enables automatic generation of search instructions and thus the time, manpower and cost for the welding seam point calibration can be reduced greatly.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF EMBODIMENTS

Hereinafter, solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

As mentioned hereinabove, in the existing solution, three face references and start points are input manually and it is a time-consuming and tedious task, which makes the calibration process less flexible and efficient. Therefore, in embodiments of the present disclosure, there is provided a solution for determining search parameters for welding seam point calibration. In embodiments of the present disclosure, three face references can be extracted automatically from a virtual model and search parameters needed for the search instructions can be determined based thereon. Thus, it enables automatic generation of search instructions and thus the time, manpower and cost for the welding seam point calibration can be reduced greatly. Hereinafter, specific embodiments of the present disclosure will be described with reference to FIGS. 1 to 11.

Figure 1:
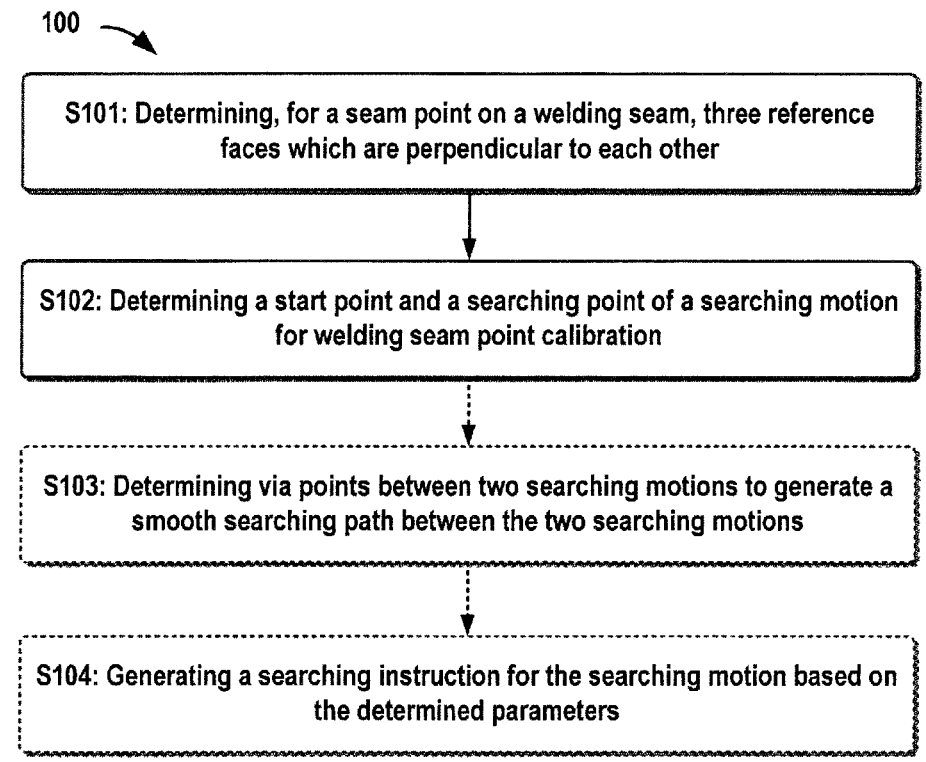
FIG. 1 schematically illustrates a flow diagram of a method of determining search parameters for welding seam point calibration according to an embodiment of the present disclosure.

Reference is first made to FIG. 1, which schematically illustrates a flow diagram of a method 100 of determining search parameters for welding seam point calibration according to an embodiment of the present disclosure.

As illustrated in FIG. 1, the method starts from step 101, in which three reference faces can be determined for a seam vertex point on a welding seam based on geometry of an object to be weld in a virtual model, wherein the three reference faces are perpendicular to each other. Herein, "the welding seam" used herein refers to a seam along which the welding is performed to weld at least two parts together. The welding seam is formed of a plurality of seam points, wherein a start point of seam and an end point of the seam can be collectively called as seam vertex points. Thus, "the seam vertex point" mentioned in step 101 means any of the two seam vertex points, i.e., the start point or the end point.

In order to find a seam point with respect to the work object, it requires three reference faces which can form a reference coordinate system, and thus in embodiments of the present disclosure, it is to locate three reference faces to locations of seam points in X, Y, Z axes respectively. The three reference faces are perpendicular to each other and their intersection lines form the X, Y, Z axes, and the common intersection point of the three axes can form an origin point of the reference coordinate system.

Figure 2:
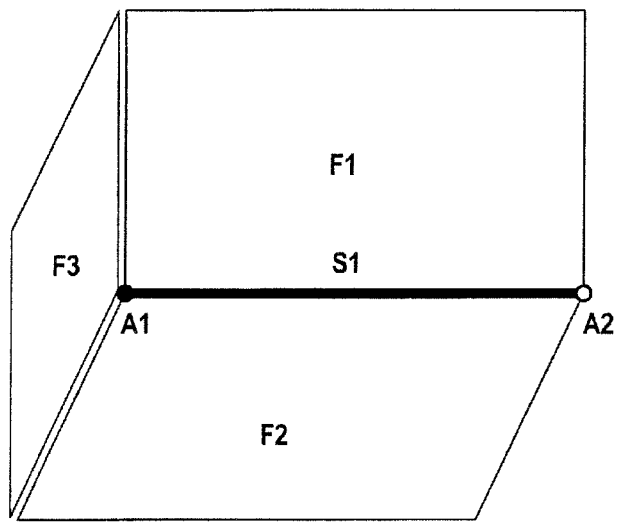
FIG. 2 schematically illustrates an example of three reference faces for a seam vertex point contained in a welding seam according to an embodiment of the present disclosure.

FIG. 2 schematically illustrates an example of three reference faces determined for a seam vertex point contained in a welding seam according to an embodiment of the present disclosure. As illustrated in FIG. 2, the welding seam S1 contains two seam vertex points A1 and A2 wherein the seam vertex point A1 is a start point and the seam vertex point A2 is an end point, and there are three reference faces F1, F2 and F3, each of which is perpendicular to other two reference faces, wherein the reference faces F1 and F2 are two faces passing through S1 and the reference face F3 is a face which is perpendicular to the welding seam S1. In addition, in FIG. 2, ideally, the seam vertex point A1 is the common intersection point of the three reference faces F1, F2 and F3.

It can be understood that any reference coordinate system can be used herein as long as it enables to find a seam point with regard to the work object. However, it will be preferable to determine the reference coordinate system as a coordinate system with one of axes passing through the welding seam and with its origin point as a seam vertex point since in such a case, it can greatly simplify the search of the seam point with respect to the work object.

In order to identify the three reference faces F1, F2 and F3, it may first determine a first reference face and a second reference face based on the geometry of the object to be weld in the virtual mode, wherein the first and second reference face are those passing the welding seam S1, i.e., F1 and F2 in FIG. 2. Usually, for a welding object such as a ship or any other object, a virtual model will be designed before the manufacturing and it can be a three-dimensional model, which may be, for example, a Computer Aided Design (CAD) model or any other kind of three-dimensional model. The virtual model is used to describe structures and setups of components the real object to weld and the robot in the real world. Thus, in the virtual model, all components or elements will be laid out in accordance with their respective real setups. The virtual model contains a plurality of geometrical bodies for the welding object. Each of the geometrical bodies has a shape such as a cuboid, a cylinder, a cone, a sphere, a semi-sphere, or any other shape or the combination thereof. Thus, all geometrical bodies can be expressed a suitable mathematics way. Thus, based on the geometry of the object to he weld in the virtual mode, it can identify two reference faces passing through the welding seam S1 and perpendicular to each other. The identifying of two perpendicular faces passing through a predetermined line can be implemented for example using any method in the art, and for a purpose of simplification, detailed description will not be provided herein.

Then, a third reference face F3 can be determined by detecting an intersection between a virtual detection part and other parts of the object to be weld in the virtual model, wherein the virtual detection part extends away from the welding seam along a direction of the welding seam.

In a case that the first and second reference faces are identified, the third reference F3 can be further identified based on the first and second reference faces. In an embodiment of the present disclosure, a virtual detection object can be used to detect the third reference face. This virtual detection object is not an object really contained in the virtual model, but a virtual object which is created on purpose to facilitate the detection of the third reference face. Thus, the third reference face can be determined By means of detecting any intersections between the virtual object and other parts of the virtual model. Particularly, it can identify one or more potential reference faces of a seam point by detecting the intersection between the virtual detection part and the other parts of the object to be weld. If a potential reference face is perpendicular to both the first reference face and the second reference face and located within a valid search range of a welding robot, it can be determined as the third reference face. The valid search range herein means a range which the welding robot can reach and detected within this range will be considered as potential reference faces. The valid search range can be in a form of limitation to distance by which a potential reference face is apart from the seam vertex point. Or alternatively, the valid search range can be represented by the extension length of the virtual detection part. This means the extension length of the virtual detection part can be used to indicate the valid search range, and any faces beyond the extension length of the virtual detection part will not be considered.

The virtual detection part can extend away from the welding seam along a direction of the welding seam. The virtual detection part may extend, for example, from the face perpendicular to both the first and second reference faces at the seam vertex point and it can be of any suitable shape.

Figure 3:
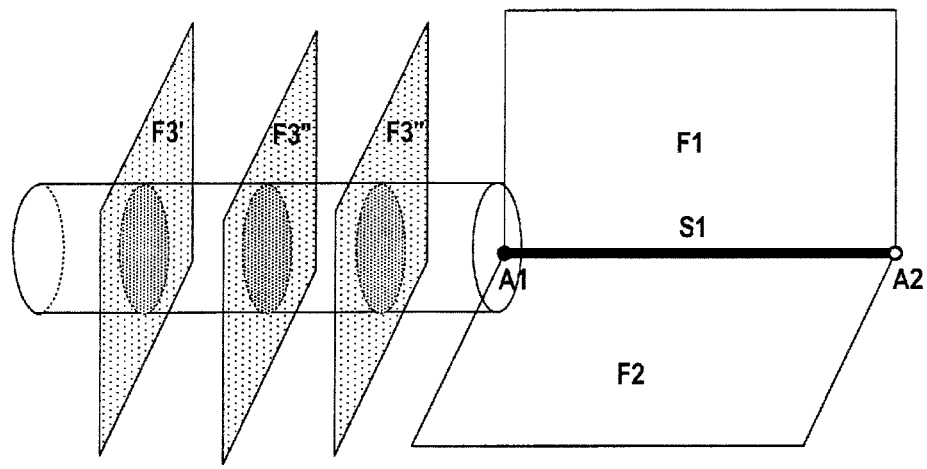
FIG. 3 schematically illustrates an example of reference face detection for a seam vertex point according to an embodiment of the present disclosure.

As illustrated in FIG. 3, the virtual detection part is a cylinder-shaped part which has a circle cross section, extends away from the welding seam S1 along a direction of the welding seam and has a central point at the seam point A1. However, as mentioned hereinabove, it shall be noticed that the shape of the virtual detection is not limited only to the cylinder with a circular section and it can be of any possible shape that can be used in detection of the third reference faces. For example, it can be of a cylinder with another shape of cross section (e.g., triangle, rectangle, ellipse, polygon, etc.), a taper, a truncated cone, or any other shape.

In addition, the seam point A1 can be the central point of the virtual detection part but it is not limited thereto, it is also possible that the seam point A1 is a point on the virtual detection part but not the central point, or it is not on the virtual detection part at all and the central point is located at a predetermined distance from the seam point A1 as long as it will not affect the accuracy of the detection of the third reference face.

For the case as illustrated in FIG. 2, in Cartesian coordinates, the orientation and location of the cylinder center can be expressed as:

$$T_{cylinder} = \begin{bmatrix} 1 & 0 & -V_x & X_{seam} \\ 0 & 1 & -V_y & Y_{seam} \\ 0 & 0 & -V_z & Z_{seam} \\ 0 & 0 & 0 & 1 \end{bmatrix} \quad (1)$$

wherein $$\begin{bmatrix} V_x \\ V_y \\ V_z \end{bmatrix}$$

indicates a vector from the seam start point to the seam end point;

$$\begin{bmatrix} X_{seam} \\ Y_{seam} \\ Z_{seam} \end{bmatrix}$$

is the location of the current seam point with respect to its work object and The negative operator "−" denotes that the cylinder extends away from the welding seam.

Based on the geometry of the object to be weld, it can first obtain one or more potential faces F3', F3'', F3''' from other parts of the object to be weld, which intersect with the virtual detection part. The detection of intersection of two surfaces can be implemented by using any known approaches in the art and thus will not be described herein for a purpose of simplification.

In a case that there is placed a virtual detection part as illustrated in FIG. 3, the third reference face shall be a reference face that intersects with the virtual detect part and at the same time is perpendicular to both the first and the second reference faces F1 and F2, its unit normal vector may be expressed as follow:

$$\begin{bmatrix} X_{face3} \\ Y_{face3} \\ Z_{face3} \end{bmatrix} = \begin{bmatrix} X_{face2} \\ Y_{face2} \\ Z_{face2} \end{bmatrix} \times \begin{bmatrix} X_{face1} \\ Y_{face1} \\ Z_{face1} \end{bmatrix} \quad (2)$$

wherein $$\begin{bmatrix} X_{face2} \\ Y_{face2} \\ Z_{face2} \end{bmatrix} \text{ and } \begin{bmatrix} X_{face2} \\ Y_{face2} \\ Z_{face2} \end{bmatrix}$$

are unit normal vectors of reference faces F1 and F2, respectively.

Thus, one of the potential reference faces can be selected as the third reference face if it is perpendicular to the first and second reference faces F1 and F2. In a case that there are more than one reference face perpendicular to both the first and the second reference faces F1 and F2, it may preferably select a reference face which is nearest to the seam point A1 as the third reference face.

If it fails to obtain any reference face for the current seam vertex point A1, then it may further check with the other seam vertex point A2 of the welding seam S1 to see whether there is any reference face available. That is to say, it may change the arrangement of the virtual detection part from the vertex point A1 to another vertex point A2.

Figure 4:
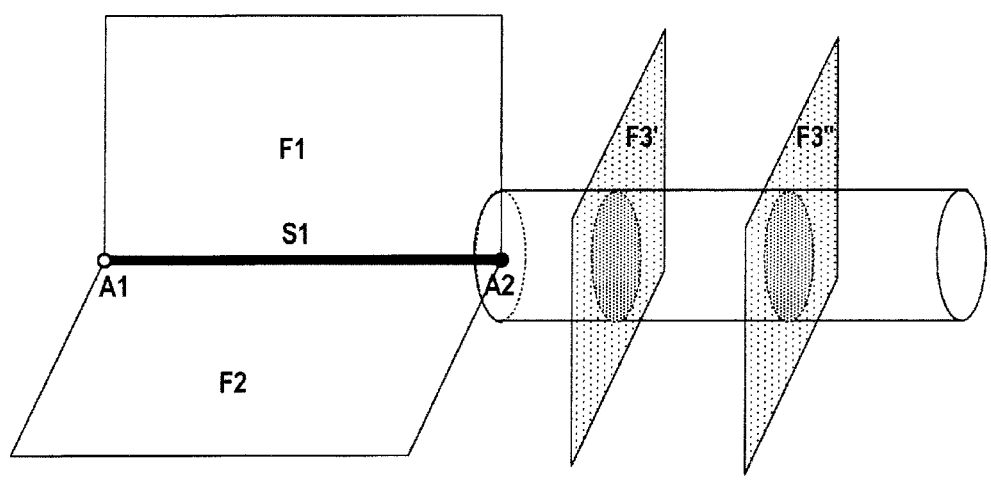
FIG. 4 schematically illustrates another example of reference face detection at another seam vertex point according to an embodiment of the present disclosure.

As illustrated in FIG. 4, the arrangement of the virtual detection part is changed and another vertex point A2 is taken as its central point. Then similar operations can be performed and obtain potential reference faces F3' and F3'', and one of reference faces F3' and F3'' which is perpendicular to both faces F1 and F2 can be selected as the third reference face.

Thus, the three reference face may be found at the start point A1 or the end point A2 and if it fails to find the faces references at one of the two points, it may try the other one. Therefore, to find three reference faces, it is required to at least perform a Smartac search at one of the seam start point and the seam end point.

Reference is made back to FIG. 1, in step 102, a start point and a search point of a search motion for welding seam point calibration are determined based on the three reference faces and predetermined criteria respectively for the start point and the search point.

A search instruction usually requires several search parameters, such as start point, search point, speed, tool weld gun, work object and etc. The start point indicates a point where a search motion starts; the search point is an object point to be searched through the search motion; the speed indicates a speed at which the robot moves; the tool weld gun indicates the location of the gun to be used in a search motion; and the workobject indicates the work object to which the used reference coordinates are related.

An Example Search Instruction in SmartTac can be as Follow:

Search_ID Result, StartPoint, SearchPoint, Speed, ToolWeldGun, WorkObject wherein "Result" indicate the returned search result, parameters "StartPoint", "SearchPoint", "Speed", "ToolWeldGun", "WorkObject" respectively indicates the above mentioned search parameters.

For the search instruction, the parameters to be filled in are StartPoint, SearchPoint, Speed, ToolWeldGun and WorkObject. In a robot station, there are stored the virtual model for the object to be weld and relative welding parameters, such as Speed, ToolWeldGun and WorkObject. For the last three parameters, the user can obtain them directly from the robot station. For the rest two parameters, they can be calculated from the reference faces obtained above.

As for the start point, it can be determined based on the three reference faces and a predetermined criterion for the start point. For example, in order to avoid colliding with reference faces and seam itself, the start point may be selected to be located with fixed distance away from the reference face, as shown in FIG. 3. That is to say, the predetermined criterion for the start point can indicate a predetermined distance from the start point to a respective one of the three reference faces.

As for another parameter, the search point, it is defined as the expected location of a feature to be searched by SmarTac sensor, which can also be determined based on the start point and another predetermined criterion for the search point. For example, the search point can be a projection point of the start point on its reference face. In other words, the other predetermined criterion for the search point indicates that the search point is determined as a projection point of the start point on the respective reference face. In such a case, the search point at a reference face can be obtained as:

$$T_{search\ point} = T_{start\ point} \cdot \begin{bmatrix} 0 \\ 0 \\ d \\ 1 \end{bmatrix} \quad (3)$$

wherein d indicates the distance between a start point and the projection of a start point on the reference face.

If it needs to perform multiple searches at a seam point, all reference faces to be searched should be taken into account when selecting the start point of the searches.

Figure 5:
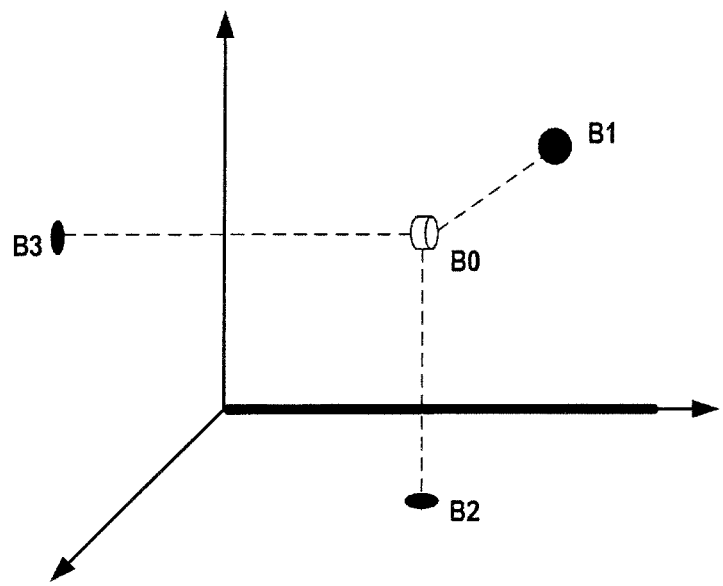
FIG. 5 schematically illustrates an example of start & search points determination according to an embodiment of the present disclosure.

FIG. 5 illustrates an example of start & search points detection according to an embodiment of the present disclosure. As illustrated in FIG. 5, the start point B0 is determined as a point which is located from three reference face by predetermined distances. The search points at respective reference face are determined as projections of the start point on the respective reference faces. However, it shall be notices that, although the projection points are described as search points, the present disclosure is not limited thereto but is possible to be any other point as long as it has a predetermined space relationship with the start point so that the offset can be determined based thereon.

By instructing the robot to search the search point from the start point, it can obtain the offset with regard this reference face. It can be understood if there is no any offset, the robot shall touch the target point at the search point. However, usually the robot will not touch the search point at the predetermined point since the arrangement of the robot and the object to be weld cannot be exactly same as that in the virtual model. Thus, difference between the real touching point and the search point can be used to determine the offset.

Figure 6:
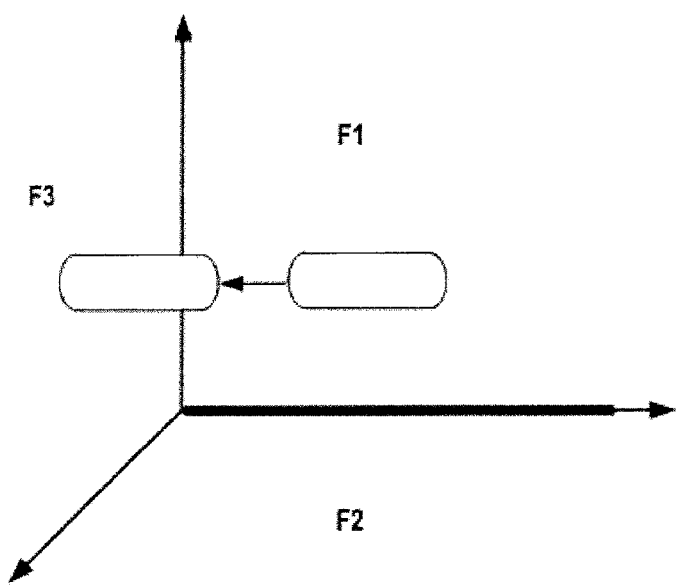
FIG. 6 schematically illustrates a robot reaching start and search points with its welding tool perpendicular to the reference face to be searched according to an embodiment of the present disclosure.

In embodiments of the present disclosure, the robot will reach the start point and the search point with its welding tool perpendicular to the object reference face. That is to say, the normal unit vector of the welding tool should be Z element (element in the third row) in rotation matrix of start point, or element in the third column of the matrix of the start point. FIG. 6 illustrates a robot reaching from a start point to a search point with its welding tool perpendicular to the reference face to be searched according to an embodiment of the present disclosure. As illustrated in FIG. 6, the robot reaches a start point with its welding tool perpendicular to the reference face F3 and search a search point while keep the orientation of the welding tool so that it is perpendicular to the reference face F3.

Figure 7:
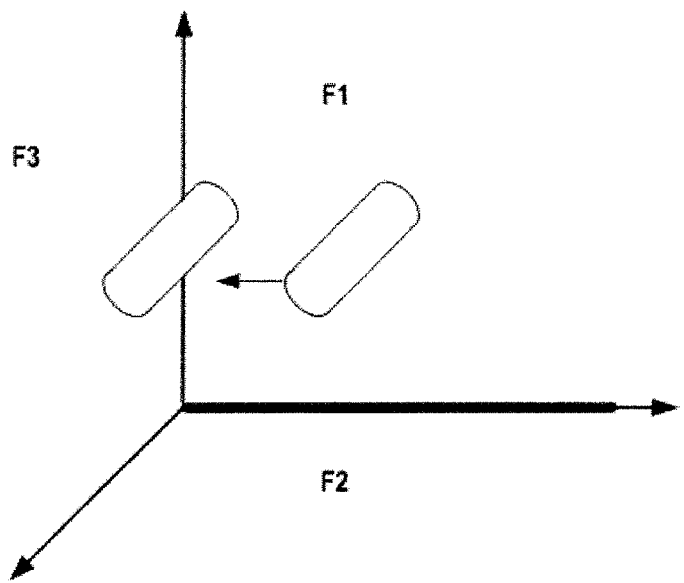
FIG. 7 schematically illustrates a robot reaching start and search points with its welding tool having an acute angle relative to the reference face to be searched according to an embodiment of the present disclosure.

However, in order to reach these points with its welding tool perpendicular to the reference face F3, it might cause an abrupt moving path and large changes in robot joints. In order to avoid these things, it is proposed to rotate the welding tool with an acute angle (such as 60 degree, 45 degree, 30 degree, or any other suitable acute angles etc.) towards the reference face to be searched instead of keeping the welding tool to be perpendicular to the reference face F3. FIG. 7 schematically illustrates a robot reaching start and search points with its welding tool having a certain angle relative to the reference face to be searched according to an embodiment of the present disclosure. As illustrated in FIG. 7, when the robot reaches the start point, its welding tool is not perpendicular to the reference face F3 but has an acute angle with regard to the reference face F3; during performing the search motion, the welding tool is kept to have the angle with regard to the reference face F3 and reaches the search point at the same angle.

In general, given the global position of seam point $P_{point}$ (Px, Py, Pz) and fixed safe distance defined by user d (dx, dy, dz), i.e., the distance of start point from the seam point, the start point can be expressed as follows:

$$T_{start\ point} = \begin{bmatrix} X_1 & X_2 & X_{face3} & Px+dx \\ Y_1 & Y_2 & Y_{face3} & Py+dy \\ Z_1 & Z_2 & Z_{face3} & Pz+dz \\ 0 & 0 & 0 & 1 \end{bmatrix} \quad (4)$$

wherein $$\begin{bmatrix} X_1 \\ Y_1 \\ Z_1 \end{bmatrix} \begin{bmatrix} X_2 \\ Y_2 \\ Z_2 \end{bmatrix} \text{ and } \begin{bmatrix} X_{face3} \\ Y_{face3} \\ Z_{face3} \end{bmatrix}$$

are unit normal vectors of reference faces F1 to F3 respectively, which is similar to equation 2.

Reference is made back to FIG. 1 and in step S103, optionally, determine via points between two search motions to generate a smooth via path between the two search motions.

After a search motion is finished, the robot shall be prepared for another search motion. In order to avoid a large change in robot joints as most as possible, it is possible to provide a via path between two search motions. The search path can be implemented by move instructions inserted in between two search instructions so that the robot can move smoothly between two search motions. A search instruction is a program instruction for instructing the robot to perform a search motion as defined by search parameters contained in the instruction and the move instruction is a program instruction for instruction the robot to perform a motion as defined by move parameters contained in the instruction. The move instructions can contain via points as their parameters so that the robot can move along the via path.

Figure 8:
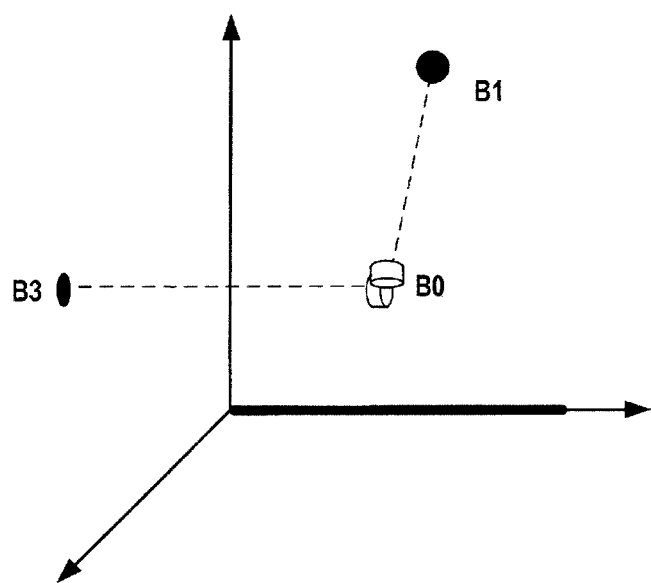
FIG. 8 schematically illustrates two search motions of a robot without via points according to an embodiment of the present disclosure.

FIG. 8 schematically illustrates two search motions of a robot without via points according to an embodiment of the present disclosure. As illustrated in FIG. 8, the first search motion is to search from the start point B0 to the search point B1 and the second search motion is to search from the start point B0 to another search point B3. If there is no via points, then the robot will go back the way it came then adjust the angle between the welding tool and the corresponding reference face F3 so as to prepare for the next search motion. That is to say, the robot will adjust the angle at the start point B0 and then continue the next search motion. However, if the robot makes adjustment at the start point B0, it might cause a large change in robot joints or collisions happened, which is undesirable.

Figure 9:
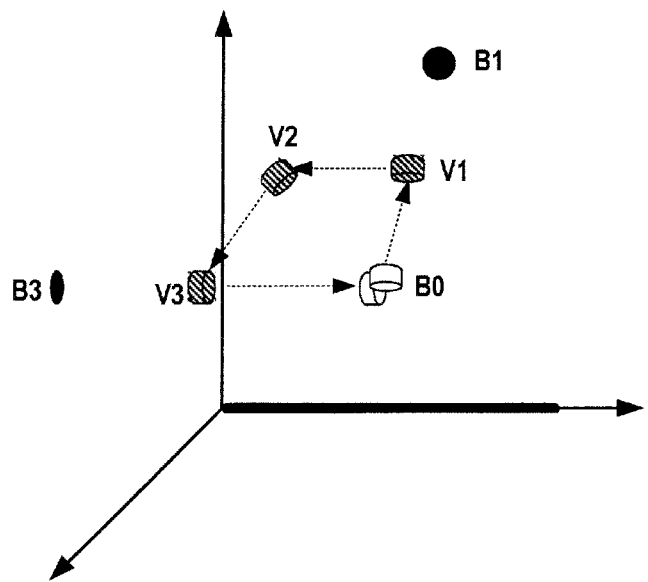
FIG. 9 schematically illustrates a via path between two search motions according to an embodiment of the present disclosure.

FIG. 9 schematically illustrates a via path between two search motions according to an embodiment of the present disclosure. As illustrated in FIG. 9, the via path is illustrated by dash lines with arrows and includes three via points, which starts from B0, passes through via points V1, V2, and V3 and finally goes back to B0. In these via points, the via point V1 is an intermediate point between the start point B0 and the search point B1, the via point V3 is an intermediate point between the start point B0 and the search B3 and the via point V2 is an intermediate point between the via points V1 and V3. The via point V1 may be any intermediate point between the start point B0 and the search point B1, for example the middle point therebetween. Like the via point V1, via points V2 and V3 may also by any intermediate points such as middle points. In addition, it can be understood that the via path illustrated in FIG. 9 is only an example and the via-path is not limited thereto, for example, it can includes more via points or have a different shape of via path.

After the first search motion for the search point B1 is finished and returns back to the start point B0, the robot will move its welding tool along the via path as illustrated in FIG. 9. First, the robot moves from the start point B0 to V1 by keeping the orientation of welding point as it is, then the robot change the orientation of the welding point when it moves from via points V1 to V2 and moves from via points V2 to V3, and finally it goes back to start point B0 from via points V3. Once the robot finishes a motion along the via path, the robot will finish the angle adjustment and be ready for the next search motion. That is to say, the angle adjustment is not preformed directly at start point B0 but is performed during moving along the via path. By means of such moving along the via path, it is possible to make sure to have less collisions happed and avoid the large change in robot joints, which would happen when the angle adjustment is performed at the start point B0.

After this, in step S104 in FIG. 1, the determined search parameters can be further used to generate a search program for the search motion. The generation of search instructions is known in the art and thus will not be detailed herein for a purpose of simplification.

Be repeating the operations as mentioned above for all desired welding seam for the object to be weld, it may obtains search parameters for search motions for welding seam point calibration and then these search parameters and optionally the via points can be used to generate the search program. It can be understood, it is possible to generate all instructions after all related parameters are determined and it is also possible to generate an instruction after related parameters for a welding seam are determined.

In an embodiment of the present disclosure, after start points, search points, via points for desired seam points are determined, all these parameters can be named in a similar fashion, such that the search instructions, via points and arc-welding instructions may have coherent parameters. Thus, it is able to generate a program that contains point declarations, followed by related search instructions, via paths for all desired seams. Thus, it is ready to deploy the controller for online configuration and further integration with arc welding instructions.

With embodiments of the present disclosure mentioned above, three reference faces can be extracted automatically and search parameters needed for the search instructions can be determined based thereon, which enables automatic generation of search instructions and thus the time, manpower and cost for the welding seam point calibration can be reduced greatly.

Figure 10:
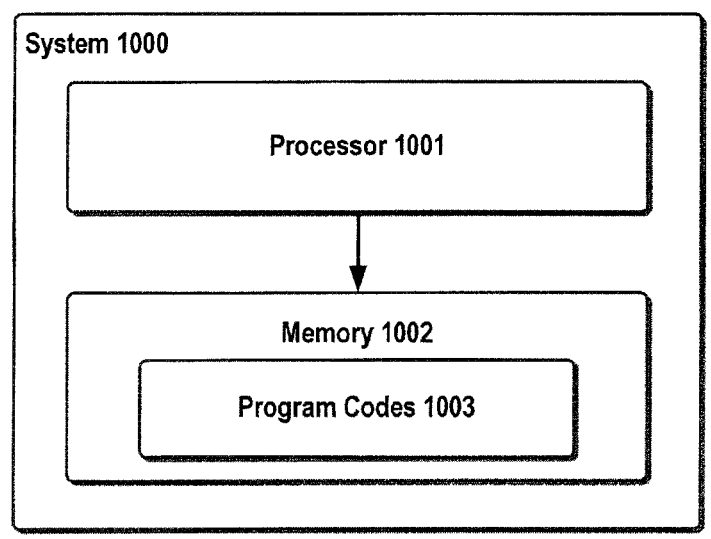
FIG. 10 schematically illustrates a system of determining search parameters for welding seam point calibration according to an embodiment of the present disclosure.

FIG. 10 further schematically illustrates a system 1000 of determining search parameters for welding seam point calibration according to an embodiment of the present disclosure. As illustrated in FIG. 10, the system 1000 comprises one or more processors 1001; a memory 1002 coupled to at least one of the processors 1001; and a set of program instructions 1003 stored in the memory and executable by at least one of the processors 1001 to cause the system 1000 to: determine, for a seam vertex point on a welding seam, three reference faces which are perpendicular to each other, based on geometry of an object to be weld in a virtual model; and determine a start point and a search point of a search motion for welding seam point calibration based on the three reference faces and predetermined criteria respectively for the start point and the search point.

In embodiments of the present disclosure, the seam point, the start point, and the search point are used to generate a searching program for welding seam point calibration.

In embodiments of the present disclosure, the system 1000 may be further caused to determine via points between two search motions to generate a smooth via path between the two search motions, wherein the via points are further used to generate the search instruction for the search motion. For example, the via points comprises an intermediate point between a start point and a search point of each of the two search motions.

In embodiments of the present disclosure, the system 1000 may be further configured to determine, if it fails to determine the three reference faces for the seam vertex point on the welding seam, another three reference faces for another seam vertex point on the welding seam.

In embodiments of the present disclosure, the search motion may be performed with a welding tool at an acute angle relative to a reference face to be searched.

In embodiments of the present disclosure, the system 1000 may be further cased to determine the three reference faces by: determining, based on the geometry of the object to be weld in the virtual mode, a first reference face and a second reference face which pass through the welding seam; and determining a third reference face by detecting an intersection between a virtual detection part and other parts of the object to be weld in the virtual model, wherein the virtual detection part extends away from the welding seam along a direction of the welding seam. Particularly, the system 1000 is further caused to determine the third reference face by: obtaining one or more potential reference faces by detecting the intersection between the virtual detection part and the other parts of the object to be weld; and determining one of the one or more potential reference faces as the third reference face if it is perpendicular to both the first reference face and the second reference face and located within a valid search range of a welding robot.

In embodiments of the present disclosure, the length at which the virtual detection part extends away from the welding seam defines the valid search range.

In embodiments of the present disclosure, the system 1000 is further caused to determine the start point and the search point for the search motion by determining the start point based on the three reference faces and a predetermined criterion for the start point; and determining the search point based on the start point and another predetermined criterion for the search point. In an example of the present disclosure, the predetermined criterion for the start point can indicate a predetermined distance from the start point to a respective one of the three reference faces. In another example of the present disclosure, the other predetermined criterion for the search point can indicate that the search point is determined as a projection point of the start point on the respective reference face.

In addition to the method and system described hereinabove, there is also presented an apparatus for determining search parameters for welding seam point calibration which will be described with reference to FIG. 11.

Figure 11:
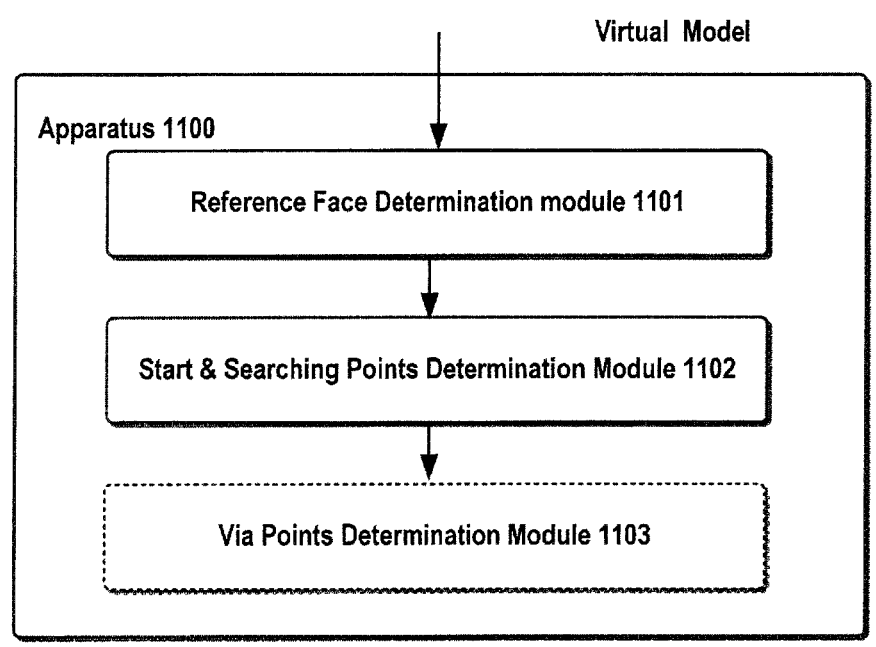
FIG. 11 schematically illustrates a block diagram of an apparatus for determining search parameters for welding seam point calibration according to an embodiment of the present disclosure.

As illustrated in FIG. 11, there is illustrated an apparatus 1100 for determining search parameters for welding seam point calibration. The apparatus may comprise a reference face determination module 1101, and a start & search points determination module 1102. The reference face determination module 1101 is configured to determine, for a seam vertex point on a welding seam, three reference faces which are perpendicular to each other, based on geometry of an object to be weld in a virtual model. The start & search points determination module 1102 is configured to determine a start point and a search point of a search motion for welding seam point calibration based on the three reference faces and predetermined criteria respectively for the start point and the search point.

In embodiments of the present disclosure, the seam point, the start point, and the search point can be used to generate a search program for the welding seam point calibration.

In another embodiment of the present disclosure, the apparatus may further comprise a via-points determination module 1103, which is configured to determine via points between two search motions to generate a smooth via path between the two search motions, wherein the via points are further used to generate the search program for the welding seam point calibration. The via points may comprise an intermediate point between a start point and a search point of each of the two search motions.

In a further embodiment of the present disclosure, the reference face determination module 1101 may be further configured to determine, if it fails to determine the three reference faces for the seam vertex point on the welding seam, another three reference faces for another seam vertex point on the welding seam.

In a still embodiment of the present disclosure, the search motion may be performed with a welding tool at an acute angle relative to a reference face to be searched.

In a further embodiment of the present disclosure, the reference face determination module 1101 is further configured to determine the three reference faces by determining, based on the geometry of the object to be weld in the virtual mode, a first reference face and a second reference face which pass through the welding seam; and determine a third reference face by detecting an intersection between a virtual detection part and other parts of the object to be weld in the virtual model, wherein the virtual detection part extends away from the welding seam along a direction of the welding seam.

Particularly, the third reference face is determined by: obtaining one or more potential reference faces by detecting the intersection between the virtual detection part and the other parts of the object to be weld; and determining one of the one or more potential reference faces as the third reference face if it is perpendicular to both the first reference face and the second reference face and located within a valid search range of a welding robot. The length at which the virtual detection part extends away from the welding seam defines the valid search range.

In a further embodiment of the present disclosure, the start & search points determination module 1102 is further configured to determine the start point and the search point for the search motion by determining the start point based on the three reference faces and a predetermined criterion for the start point; and determine the search point based on the start point and another predetermined criterion for the search point. In an example of the present disclosure, the predetermined criterion for the start point can indicate a predetermined distance from the start point to a respective one of the three reference faces. In another example of the present disclosure, the other predetermined criterion for the search point can indicate that the search point is determined as a projection point of the start point on the respective reference face.

It is to be understood that specific embodiments of the present disclosure are described with reference to the accompanying drawings; however, they are presented only for illustration purposes and the present disclosure is not limited thereto. For example, the embodiments are described mainly with reference arc welding; however the present disclosure it not limited thereto, and it is possible to apply in any other welding application with similar issues; the SmarTac search program is described hereinabove and the search program can also be any kind of search program as long as it is used to perform search motions for welding seam point calibration and correction.

The skilled in the art can also appreciate that the solution as provided herein may take the form of a hardware embodiment, a software embodiment (including firmware, resident software, micro-code, etc.) or an embodiment combining software and hardware aspects. That is to say, the reference face determination, start & search point determination, via points determination and instruction generations can be implemented by electronic elements or devices, software stored in storage device, or the combination of electronic devices and the software, for example by micro-processors, digital signal processor, simple chip machine, and suitable programs etc.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of determining search parameters for welding seam point calibration using a set of program instructions stored in memory and executable by a processor to perform the method, comprising:
   determining, for a seam vertex point on a welding seam, three reference faces which are perpendicular to each other, based on geometry of an object to be welded in a virtual model having a virtual model coordinate system, wherein the virtual model is a CAD model of the object to be welded and the three reference faces are automatically extracted from the CAD model, and wherein a common intersection point of the three reference faces defines the seam vertex point on the welding seam;
   determining a start point and a search point for each of two search motions for the welding seam point calibration based on the three reference faces and predetermined criteria respectively for the start point and the search point;
   determining via points at predefined exact positions in the virtual model coordinate system between the two search motions to generate a smooth via path between the two search motions;
   generating a searching program for the welding seam point calibration using the seam vertex point, the start points, the search points and the via points;
   robotically moving a welding tool along the two search motions and the smooth via path using the searching program to determine the welding seam point calibration; and
   robotically welding the welding seam using the welding seam point calibration; wherein the determining three reference faces comprises:
      determining, based on the geometry of the object to be welded in the virtual model, a first reference face and a second reference face which pass through the welding seam; and
      determining a third reference face by detecting an intersection between a virtual detection part and other parts of the object to be welded in the virtual model, wherein the virtual detection part extends away from the welding seam along a direction of the welding seam.

2. The method of claim 1, wherein the via points comprise an intermediate point between a start point and a search point of each of the two search motions.

3. The method of claim 1, further comprising: determining, if it fails to determine the three reference faces for the seam vertex point on the welding seam, another three reference faces for another seam vertex point on the welding seam.

4. The method of claim 1, wherein the search motion is performed with a welding tool at an acute angle relative to a reference face to be searched.

5. The method of claim 1, wherein the determining the third reference face comprises:
   obtaining one or more potential reference faces by detecting the intersection between the virtual detection part and the other parts of the object to be welded; and
   determining one of the one or more potential reference faces as the third reference face if it is perpendicular to both the first reference face and the second reference face and located within a valid search range of a welding robot.

6. The method of claim 5, wherein the length at which the virtual detection part extends away from the welding seam defines the valid search range.

7. The method of claim 1, wherein the determining the start point and the search point for each of the two search motions comprises:
   determining the start point based on the three reference faces and a predetermined criterion for the start point; and
   determining the search point based on the start point and another predetermined criterion for the search point.

8. The method of claim 7, wherein the predetermined criterion for the start point indicates a predetermined distance from the start point to a respective one of the three reference faces, and/or
   wherein the other predetermined criterion for the search point indicates that the search point is determined as a projection point of the start point on the respective reference faces.

9. A system of determining search parameters for welding seam point calibration, comprising:
   one or more processors;

a memory coupled to at least one of the processors; and
a set of program instructions stored in the memory and executable by at least one of the processors to cause the system to:
determine, for a seam vertex point on a welding seam, three reference faces which are perpendicular to each other, based on geometry of an object to be welded in a virtual model having a virtual model coordinate system, wherein the virtual model is a CAD model of the object to be welded and the three reference faces are automatically extracted from the CAD model, and wherein a common intersection point of the three reference faces defines the seam vertex point;
determine a start point and a search point for each of two search motions for the welding seam point calibration based on the three reference faces and predetermined criteria respectively for the start point and the search point;
determine via points at predefined exact positions in the virtual model coordinate system between the two search motions to generate a smooth via path between the two search motions;
generate a searching program for the welding seam point calibration using the seam vertex point, the start points, the search points, and the via points;
robotically move a welding tool along the two search motions and the smooth via path using the searching program to determine the welding seam point calibration; and
robotically weld the welding seam using the welding seam point calibration;
wherein the system is further caused to determine the three reference faces by:
  determining, based on the geometry of the object to be welded in the virtual model, a first reference face and a second reference face which pass through the welding seam; and
  determining a third reference face by detecting an intersection between a virtual detection part and other parts of the object to be welded in the virtual model, wherein the virtual detection part extends away from the welding seam along a direction of the welding seam.

10. The system of claim 9, wherein the via points comprises an intermediate point between a start point and a search point of each of the two search motions.

11. The system of claim 9, wherein the system is further caused to:
determine, if it fails to determine the three reference faces for the seam vertex point on the welding seam, another three reference faces for another seam vertex point on the welding seam.

12. The system of claim 9, wherein the two search motions are performed with the welding tool at an acute angle relative to the reference face to be searched.

13. The system of claim 9, wherein the system is further caused to determine the third reference face by:
obtaining one or more potential reference faces by detecting the intersection between the virtual detection part and the other parts of the object to be welded; and
determining one of the one or more potential reference faces as the third reference face if it is perpendicular to both the first reference face and the second reference face and located within a valid search range of a welding robot.

14. The system of claim 13, wherein a length at which the virtual detection part extends away from the welding seam defines the valid search range.

15. The system of claim 9, wherein the system is further caused to determine the start point and the search point for each of the two search motions by
determining the start point based on the three reference faces and a predetermined criterion for the start point; and
determining the search point based on the start point and another predetermined criterion for the search point.

16. The system of claim 15, wherein the predetermined criterion for the start point indicates a predetermined distance from the start point to a respective one of the three reference faces, and/or
wherein the other predetermined criterion for the search point indicates that the search point is determined as a projection point of the start point on the respective reference face.

* * * * *